Feb. 8, 1955     C. E. CRAWFORD     2,701,620
OIL, GAS, AND WATER SEPARATOR
Filed April 30, 1951     2 Sheets-Sheet 1
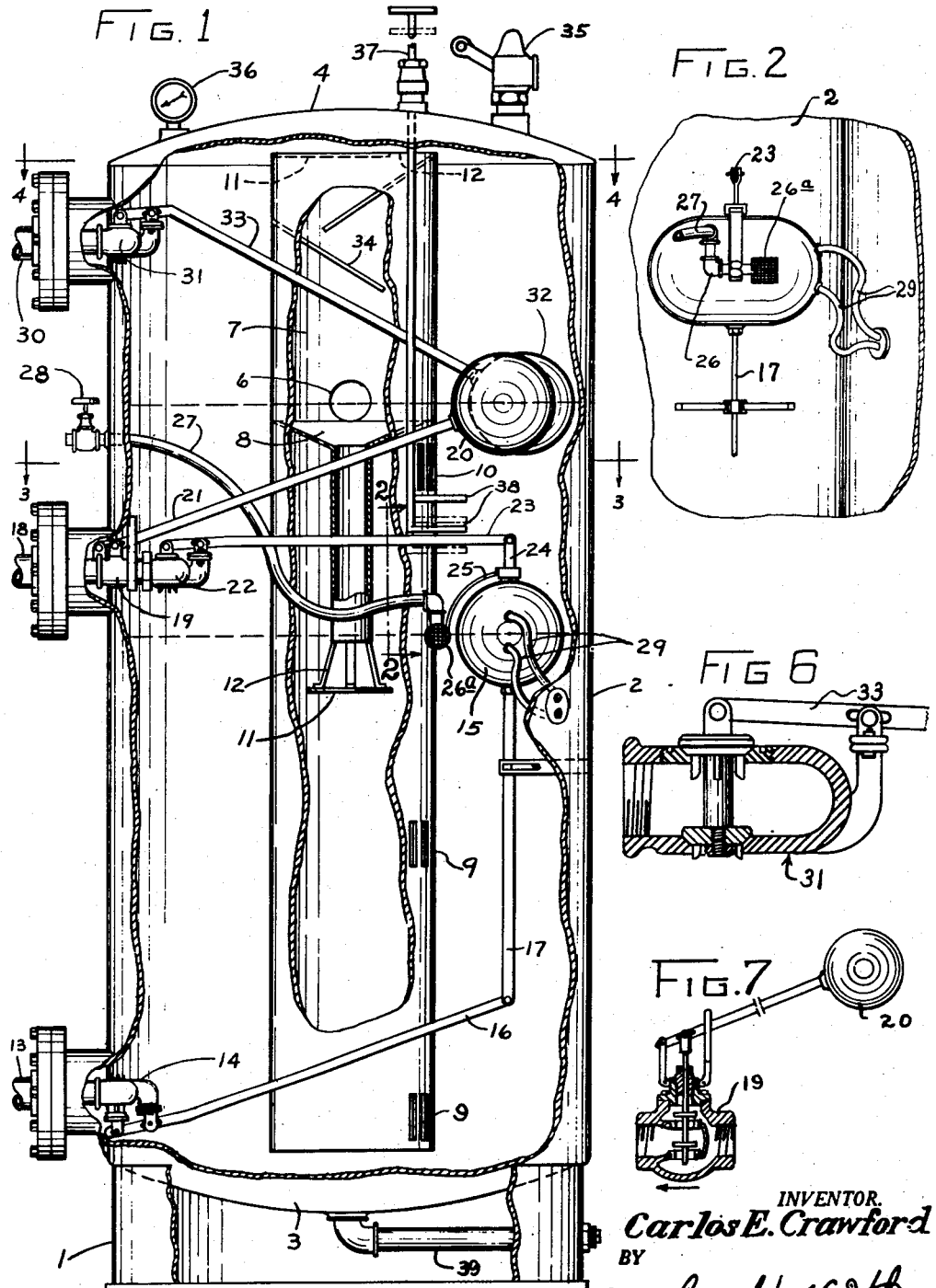
INVENTOR.
Carlos E. Crawford
BY
Wayland D. Keith
HIS AGENT.

Feb. 8, 1955  C. E. CRAWFORD  2,701,620
OIL, GAS, AND WATER SEPARATOR
Filed April 30, 1951  2 Sheets-Sheet 2
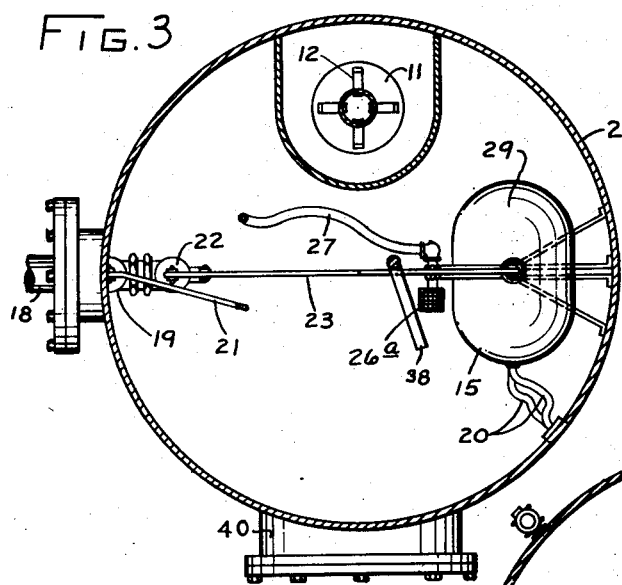
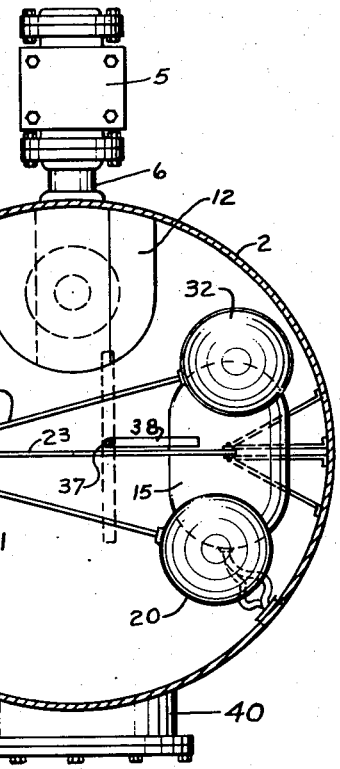
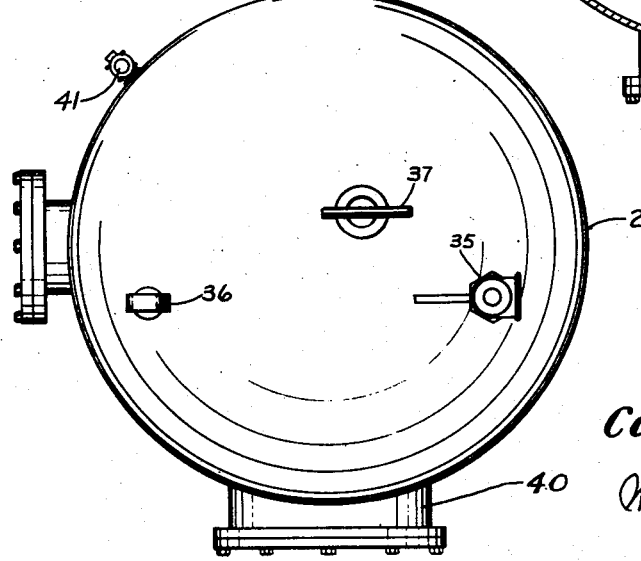
INVENTOR.
Carlos E. Crawford
BY
Wayland D. Keith
HIS AGENT.

United States Patent Office 2,701,620
Patented Feb. 8, 1955

2,701,620

OIL, GAS, AND WATER SEPARATOR

Carlos E. Crawford, Wichita Falls, Tex.

Application April 30, 1951, Serial No. 223,783

4 Claims. (Cl. 183—2.7)

This invention relates to improvements in oil, gas and water separators, and more particularly to separators that may be operated under a wide variety of conditions with respect to the oil, gas and water ratios.

In the production of crude oil from the earth, the proportions of oil, gas and water vary greatly from well to well, as does the specific gravity of the oil and the pressure of the gas.

Various oil, water and gas separators have been proposed heretofore, but these, for the most part, would operate only under certain specific conditions, and within a minimum range of variations and usually the degree of efficiency would vary greatly with the variation in conditions present.

An object of this invention is to provide an oil, gas and water separator in which both the water level and the oil level within the separator may be maintained at the desired level within the separator independently of the gas pressure within the vessel.

Another object of this invention is to provide an oil, gas and water separator in which an inter-face float is adapted to operate intermediate liquids of different specific gravities and which float may be "loaded" from the exterior of the vessel, while the float is in operation, thereby regulating the outlet of the liquids from the vessel and also regulating the high and low level of the heavier density liquid.

Another object of this invention is to provide a separator that will not "load up" and discharge oil through the gas outlet pipe, or discharge water through the oil discharge pipe, or discharge oil out through the water outlet.

Another object of the present invention is to provide an oil, gas and water separator the interior valves of which are normally automatically controlled by the fluids within the device or the valves may be manually controlled from the exterior thereof, as desired.

Another object of the invention is to provide a means for removing the sludge and emulsion that is usually present in crude oil, at the point of inter-face adjacent the float so as to enable a sharp definition of the liquids and for a ready reaction of the float.

The present invention provides an oil, gas and water separator for removing the excess free water from the oil, gas and water as produced from the well, and for the discharge, under pressure that may be maintained within the separator, into the proper tanks or pits and at the same time maintaining the desired pressure on the oil or water so that it may be discharged at any elevation within the range of pressure applied to the fluid in the vessel through the fluid inlet to the vessel.

An embodiment of this invention is illustrated in the accompanying drawings, in which;

Fig. 1 is an elevational view of the invention showing parts broken away and with parts shown in section and with parts in dot-dash outline to indicate respective movements;

Fig. 2 is a fragmentary sectional view of the invention taken on the line 2—2 of Fig. 1, looking in the direction indicated by the arrows;

Fig. 3 is a sectional view taken of the line 3—3 of Fig. 1, looking in the direction indicated by the arrows;

Fig. 4 is a sectional view taken on the line 4—4 of Fig. 1, looking in the direction indicated by the arrows;

Fig. 5 is a top plan view of the invention;

Fig. 6 is an enlarged sectional view through one of the control valves; and

Fig. 7 is a vertical sectional view through the low level oil shut off valve, with parts shown in elevation, parts broken away and shortened.

With more particular reference to the drawing the numeral 1 designates a base upon which a shell 2 is mounted. In the form of the invention illustrated, an upright, elongated cylindrical casing is provided having a bottom portion 3 and a top portion 4, which may be of the convex or dished head type, such as is used in high pressure vessels so as to form a fluid tight vessel. A strainer 5 within a fluid inlet line 6 is provided for removing certain foreign matter from the fluid produced from the well. A flume 7 extends from a point near the bottom of the shell 2 to a point near the top thereof, the upper portion thereof having baffles 34 therein and forming a gas scrubber, which flume has an outlet 12 in the upper end plate 11 thereof. The inlet line 6 discharges fluid produced from the well, that is oil, gas, and water, into the flume 7 approximately at the oil and gas interface. The gas rises upward within the flume which serves as a scrubber and through baffles 34 which removes excess liquid therefrom, which liquid flows downward into belled pipe 8 and is discharged at approximately the oil and water interface, whereupon, if any water is contained therein, it will settle downward into the water zone and out through slots 9, or if any oil is contained within the liquid, it will rise upward within the flume and discharge out through slots 10. By maintaining the oil, gas and water within the flume 7 until the fluids have sought their respective levels, agitation of the fluid near the respective valves is eliminated, therefore the respective valves will draw off their respective fluids in their most nearly pure form. A belled down pipe 8 is provided within flume 7 immediately below inlet pipe 6, so as to direct incoming fluid to a point approximately at the inter-face of the two liquids of different densities, such as oil and water. However, due to the incoming fluid being substantially surrounded by the flume 7 the water or fluid of heavier density, is allowed to flow gently down to the lower portion of the vessel and out through slots 9 while the oil or fluid of lighter density will float upward within the flume 7 and out through slotted holes 10 into the annular space formed between the flume 7 and the shell 2. Any gas that may pass downward with the oil and water will also flow upward and out through slotted openings 9.

The belled pipe 8 has a diverter plate 11 spaced downward therefrom and secured thereto by straps 12 so as to check the downward rush of the fluid. After the descent of thed fluid is checked by diverter plate 11, the liquids of respective densities will seek their respective levels within the shell 2. A water outlet pipe 13, having a valve 14 on the inner end thereof, is positioned in the lower portion of the shell 2 and is controlled by a float 15, which is connected to arm 16 by a linkage 17.

An oil outlet pipe 18 is provided a spaced distance above water outlet pipe 13 and has two valves positioned therein within vessel 2, valve 19 being the "low level" oil shut-off valve, which is controlled by a float 20 attached to arm 21, which valve closes when the oil level goes below a predetermined point, so as to prevent the outrush of gas within the upper portion of shell 2. The second valve 22 is spaced inward from valve 19 and positioned in series therewith. The valve 22 is operable by arm 23 attached to float 15 by a linkage 24. The float 15 has an arm 25 attached thereto and depends downward and outward, and has a pipe fitting 26 secured thereto approximately at a horizontal line intersecting the greater diameter of the float. An open pipe fitting, as will best be seen in Figs. 1 and 2, is positioned to receive the fluid from a point adjacent the float so that emulsified fluid, without a definite stable gravity, may be conducted outward through fitting 26, hose 27, and valve 28 at periodic intervals so as to assure efficient operation of the float 15 at the interface between the liquids of different densities, such as water and crude oil. It is necessary to balance the float 15 so it will sink in oil and yet float in water to perform the operation desired, and since the gravities of crude oil have a wide variance, as does water that contains various solids, such as salts and the like, in order to compensate for this variation, a pair of hose 29 is connected with the interior of the float and extends to and through the shell 2 so a balancing agent such as a liquid may be introduced into the float or removed therefrom until the float will operate at the desired place, which also maintains the open pipe fitting 26, which usually carries a screen 26a, at the interface of the liquids.

The pair of hose 29 connect with the interior of the float 15 so a liquid or other balancing agent may be introduced through one of the hose, while the air will be allowed to escape through the other hose 29. In this manner the float 15 may be filled to the desired level, so as to balance between the water and the oil, after which time, the openings in the shell through which the balancing media is passed, may be plugged so as to maintain the float in the correct balance. A hose 27 passes through the shell 2 and connects with an arm 25 that is attached to the float 15 in such manner that a screen 26a which is located at the oil and water interface enables emulsified oil, that does not have a definite specific gravity, to be removed from around the float through hose 27, thereby giving a sharp definition of difference in densities of the respective liquids to enable proper performance of the float 15.

A gas outlet pipe 30 is provided in the upper portion of the shell 2 and has a valve 31 on the inner end thereof, which is operably controlled by float 32, which normally floats on top of the oil level as does float 20. The float 32 is connected to valve 31 by arm 33. The valves 14, 19, 22 and 31 are for releasing water, oil and gas, in accordance with the position in which the floats control the respective valves, as pointed out, these valves are normally controlled by the liquid level within the vessel, however they may also be controlled by manipulation of a manually actuated rod 37 to open or close any of the selected valves.

The flume 7 has baffles 34 in the upper portion thereof to dehydrate the oil laden gas that passes upward and outward through vent 12 in the top thereof. A safety valve 35 is provided for relief of excess pressures within shell 2. A pressure gauge 36 is also provided for indication of pressure therein.

At certain times it is desirable to open or close valves 14, 19, 22 or 31 manually from a point exterior of the vessel. For doing this a rod 37 is provided which has a T-handle on the upper end thereof and an out-turned fork 38 at the lower end thereof, which fork is adapted to engage arms 21, 23 or 33 for the movement of floats 15, 20 or 32 for the control of the respective valves operated thereby.

A drain pipe 39 is provided for draining the vessel when it is desired to clean same. A manhole 40 is provided in one side of the vessel to enable entrance to be gained thereinto when necessary. A gauge glass 41 is also provided in order to determine the various levels of the liquids within the shell of the vessel 2.

Having thus described my invention, I claim:

1. In an oil and water separator vessel for separating the respective liquids passing therethrough, an upright shell having upper end lower end members fitted therein to form a substantially closed, pressure tight vessel, a flume fitted within said shell and extending from a point near the top thereof to a point near the bottom thereof, said flume having an opening formed near the bottom and an opening formed between the top and the mid portion of the flume and an intermediate opening formed between said two openings, in said shell having an inlet opening formed therein and in direct communication with said flume, said shell having an oil outlet opening and a water outlet opening formed therein, valves positioned within said vessel, which valves are adapted to close the respective outlet openings in said shell when in one position or to open said openings when in another position, a float mounted within said vessel, which float is responsive to the level of the heavier liquid, means connecting said float to each of said valves, and a pair of hollow flexible members leading from the interior of said float to the exterior of said vessel to enable a balancing media to be introduced into said float from a point exterior of said vessel while said vessel is maintained in substantially fluid tight condition.

2. In an oil and water separator vessel for separating the respective liquids passing therethrough, an upright shell having upper and lower end members fitted therein to form a substantially closed, pressure tight vessel, a flume fitted within said shell and extending from a point near the top thereof to a point near the bottom thereof, said flume having an opening formed near the bottom and an opening formed between the top and the mid portion of the flume and an intermediate opening formed between said two openings, said shell having an inlet opening formed therein and in direct communication with said flume, said shell having an oil outlet opening and a water outlet opening formed therein, valves positioned within said vessel, which valves are adapted to close the respective outlet openings in said shell when in one position or to open said openings when said valves are in another position, a float mounted within said vessel, which float is responsive to the level of the heavier liquid, means connecting said float to each of said valves, a pair of hollow, flexible members leading from the interior of said float to the exterior of said closed vessel to enable a balancing media to be introduced into said float from a point exterior of said vessel while said vessel is maintained in substantially fluid tight condition, a further valve within said vessel which valve is also adapted to close said oil outlet opening when in one position and to open said opening when in another position, and a float adapted to float on a liquid of any density operatively connected to said further valve and adapted to independently control the flow of oil therethrough.

3. In an oil, water and gas separator vessel for separating the respective fluids passing therethrough, an upright shell having upper and lower end members fitted therein to form a substantially closed, pressure tight vessel, a flume fitted within said shell and extending from a point near the top thereof to a point near the bottom thereof, said flume having an opening formed near the bottom and an opening formed between the top and the mid portion of the flume and an intermediate opening formed between said two openings, said shell having an inlet opening formed therein and in direct communication with said flume, said shell having an oil outlet and a water outlet opening formed therein, a pair of valves mounted within said vessel which valves are adapted to close the respective oil and water outlet openings in said shell when said valves are in one position and to open said oil outlet and said water outlet openings when the respective valves are in another position, a float mounted within said vessel, which float is responsive to the level of the water, means connecting said float to each of said valves, a pair of hollow, flexible members leading from the interior of said float to the exterior of said closed vessel to enable a balancing media to be introduced into said float from a point exterior of said vessel while said vessel is maintained in substantially fluid tight condition, said shell having a gas outlet opening formed therein near the upper end thereof, third and fourth valves mounted within said vessel, said third mentioned valve also being adapted to close said oil outlet when in one position and to open said oil outlet when in another position independently of said first mentioned oil outlet valve, a second float responsive to the oil level, which float is operatively connected to said third mentioned valve for controlling the opening and closing thereof, said fourth mentioned valve being adapted to close said gas outlet when in one position and to open said gas outlet when said valve is in another position, and a third float responsive to the oil level in said vessel, which third float is operatively connected to said fourth mentioned valve for controlling the opening and closing thereof, but in inverse relation with respect to said third mentioned valve.

4. In an oil and water separator vessel for separating the respective liquids passing therethrough, an upright shell having upper and lower end members fitted therein to form a substantially closed, pressure tight vessel, a flume fitted within said shell and extending from a point near the top thereof to a point near the bottom thereof, said flume having an opening formed near the bottom and an opening formed between the top and the mid portion of the flume and an intermediate opening formed between said two openings, said lower and intermediate openings being positioned in the water and oil zones respectively for conducting the respective liquids directly to their respective zones, said shell having an inlet opening formed therein and in direct communication with said flume, said shell having an oil outlet opening and a water outlet opening formed therein, valves positioned within said vessel, which valves are adapted to close the respective outlet openings when in one position and to open said openings when the respective valves are in another position, a float mounted within said vessel, which float is operatively connected to said valve in said water outlet and to said valve in said oil outlet, means of balancing said float at the interface of said water and said oil, a flexible tube having an open end, which tube is attached to said float so said open end will be substantially at said interface, which tube extends to a point exterior of said vessel, and a valve in said tube which valve is exterior of said vessel and operable for withdrawing from a point adjacent said float at approximately the interface of said liquids.

References Cited in the file of this patent

UNITED STATES PATENTS

| Number | Name | Date |
| --- | --- | --- |
| 611,314 | Cullinan | Sept. 27, 1898 |
| 804,908 | Williams | Nov. 21, 1905 |
| 1,557,103 | Smith | Oct. 13, 1925 |
| 1,897,398 | Raymond | Feb. 14, 1933 |
| 1,946,229 | McMurray | Feb. 6, 1934 |
| 2,016,642 | Lincoln | Oct. 8, 1935 |
| 2,037,245 | Leifheit | Apr. 14, 1936 |
| 2,179,131 | Millard | Nov. 7, 1939 |
| 2,301,972 | Richter | Nov. 17, 1942 |
| 2,338,986 | Waterman | Jan. 11, 1944 |
| 2,525,154 | Taylor | Oct. 10, 1950 |
| 2,601,904 | Erwin | July 1, 1952 |
| 2,609,099 | Griswold | Sept. 2, 1952 |